United States Patent
Bergstrøm

(10) Patent No.: US 10,232,334 B2
(45) Date of Patent: Mar. 19, 2019

(54) GASKET FREE GRID MODULES FOR CATALYST SUPPORT AND A MODULAR SYSTEM HEREOF

(71) Applicant: Haldor Topsøe A/S, Kgs. Lyngby (DK)

(72) Inventor: Jesper Rune Bergstrøm, Fredensborg (DK)

(73) Assignee: Haldor Topsoe A/S, Lyngby (DK)

( * ) Notice: Subject to any disclaimer, the term of this patent is extended or adjusted under 35 U.S.C. 154(b) by 12 days.

(21) Appl. No.: 15/104,043

(22) PCT Filed: Mar. 20, 2015

(86) PCT No.: PCT/EP2015/056013
§ 371 (c)(1),
(2) Date: Jun. 13, 2016

(87) PCT Pub. No.: WO2015/140331
PCT Pub. Date: Sep. 24, 2015

(65) Prior Publication Data
US 2016/0310923 A1    Oct. 27, 2016

(30) Foreign Application Priority Data
Mar. 21, 2014   (DK) ................................ 2014 00162

(51) Int. Cl.
*B01J 8/02* (2006.01)
*B01J 8/04* (2006.01)
*B01J 19/24* (2006.01)

(52) U.S. Cl.
CPC ................ *B01J 8/02* (2013.01); *B01J 8/025* (2013.01); *B01J 8/0449* (2013.01); *B01J 2208/00884* (2013.01)

(58) Field of Classification Search
CPC ..... B01J 8/00; B01J 8/02; B01J 8/0242; B01J 8/025; B01J 19/00; B01J 19/24; B01J 2208/00796; B01J 2208/00884
See application file for complete search history.

(56) References Cited

U.S. PATENT DOCUMENTS

| | | | |
|---|---|---|---|
| 2,363,623 A | 11/1944 | Roach et al. | |
| 2,483,178 A | 9/1949 | Otto | |
| 3,977,834 A | 8/1976 | Alcock et al. | |
| 5,118,449 A * | 6/1992 | Wade ..................... | B01D 3/326 261/114.1 |
| 2009/0047194 A1 | 2/2009 | Nascimento et al. | |
| 2012/0014948 A1 | 1/2012 | Killen et al. | |

FOREIGN PATENT DOCUMENTS

WO       WO 96/02321 A1    2/1996

OTHER PUBLICATIONS

Wikipedia definition of tongue/groove connection: https://ru.wikipedia.org/wiki/%D0%A8%D0%BF%D1%83%D0%BD%D1%82.

* cited by examiner

*Primary Examiner* — Natasha E Young
(74) *Attorney, Agent, or Firm* — Blank Rome LLP

(57) ABSTRACT

A grid module (2a, 2b) for a catalyst support comprising one or more sides arranged with a module connecting part (11) to engage in a tongue/groove connection with a matching receiving connecting part (8a, 8b) on an external structure (7a, 7b).

21 Claims, 7 Drawing Sheets

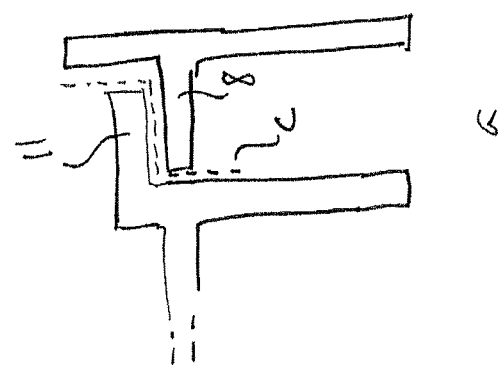
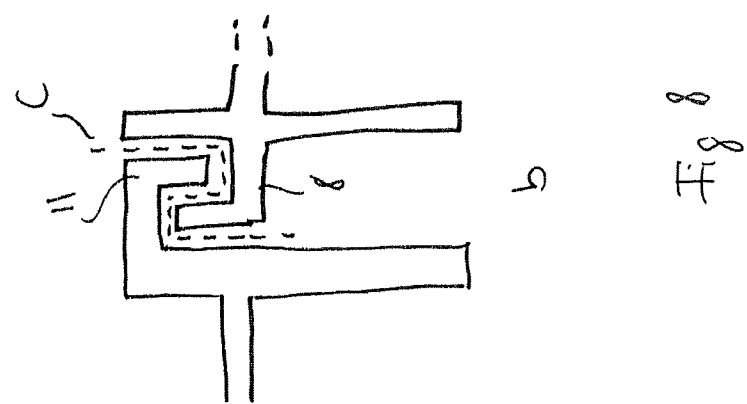
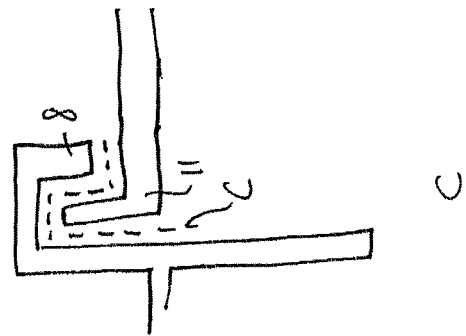
Fig. 8

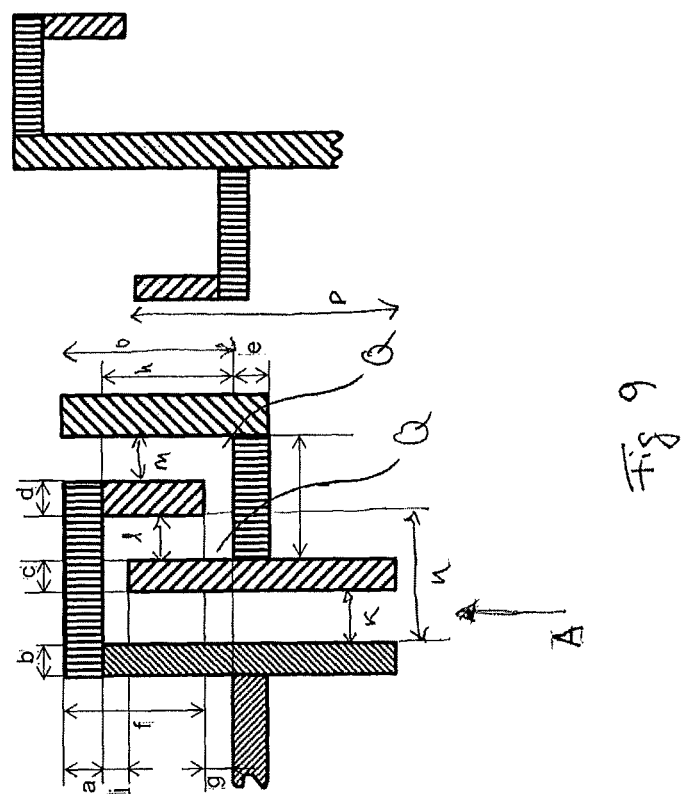

GASKET FREE GRID MODULES FOR CATALYST SUPPORT AND A MODULAR SYSTEM HEREOF

This invention relates to grid modules for catalyst support.

Catalyst supports in various types of reactors, such as hydro processing reactors, are built by a number of modular grids. Each module has a weight of 100-500 kg. During maintenance operation, 1-3 grid modules are typically removed to allow the passage of operators to the lower levels of the reactors, and thus, some of the modular grids serve as manways.

Modular grids are in known systems tightened to the support beams and to each other by means of gaskets. Tightness has to be such that catalyst or any other solid particles or debris are prevented to pass through the catalyst support. I.e. the fit between modules and external structures such as other modules, support beams etc. needs to be relatively tight in order to prevent leakage of debris even when there is a pressure difference across the support grid. If leakage happens the consequence is failure and breakage of the below equipment such as distributor tray, mixer, or other.

Once maintenance operation has been performed, the known catalyst support modules are reassembled and, by means of gaskets, tightness with respect to the support is ensured.

However, the use of gaskets has proven cumbersome in practice. Cumbersome operations take place during the practice of disassembly of the modular grid, as the gasket, subject to operations involving high temperature, pressure and sticky feedstock material tend to be stuck such that removal of the gasket itself may take from 30 mins up to several hours. Similarly, cumbersome operations take place also during reassembly, as the gaskets tend to slip away from their position. In order to facilitate operations sometimes glued gaskets are used.

However, due to confined space, protective equipment and the high weight of the individual module, the manoeuvrability of the module in the space is limited and reassembling of a grid module may offer challenges. Both in disassembly and reassembly of the modular grid, challenges offered by the gaskets increase unnecessarily the time that the operator remain in the confined space and therefore his/her exposure to risk.

Thus there is a need for new catalyst support grid systems and ways of handling them especially in order to optimize the procedures regarding maintenance.

In a first aspect of the grid modules and systems according to the opening paragraph is provided grid modules and systems which enable more efficient installation.

In a second aspect of the grid modules and systems according to the opening paragraph is provided grid modules and systems which reduce the need for gaskets In a third aspect of the grid modules and systems according to the opening paragraph is provided grid modules and systems which enable optimized and safer handling of manway modules during maintenance These and other advantages are achieved by a grid module for a catalyst support comprising one or more sides arranged with a module connecting part to engage in a tongue/groove connection with a matching receiving connecting part on an external structure whereby a tight connection between the module and one or more external structures is achieved. Surprisingly the connection formed between the grid module and the external structure has been shown by the applicant to be tight enough to allow for a gasket free connection between grid module and external structure. As the tongue/grove connection can be gasket-free the known time consuming processes for maintenance which include complete or partial removal of one or more grid modules can be avoided by the present invention. The tongue/groove connection furthermore allows for easy installation when the catalyst support is initially installed as the grid modules may be fixed to each other and/or other external structures by means of at least the tongue/groove connection achieved by the module connecting part and a matching receiving connecting part.

The tongue/groove connection can also be used to guide and fixate the grid modules during installation thereby simplifying the process of installation.

The specific design of the tongue/groove connection and thus of the module connecting part may vary. I.e. a grid module may comprise a first, second and/or third type of module connecting part.

The grid module may be a manway grid module or a regular grid module. A manway grid module is a module which is arranged to be temporarily removed during maintenance of the reactor allowing personnel to use the opening created by removal of one or more manway grids as a passage and thereby enable access to the lower parts of the reactor. In relation to the manway grid modules the gasket-less connection is highly advantageous.

Regular grid modules are modules which constitute the remaining parts of the catalyst support grid (i.e. not manways) or at least parts of the remaining parts of the catalyst support grid.

The external structure which the manway grid module and/or regular module can connect to along one or more sides may be a manway frame, beam wall, (another) regular grid module and/or (another) manway grid module thereby providing at least one gasket-less seal between the module connecting part on the grid module and the receiving connecting part on one or more external structures. Thus, the grid module in form of a manway grid module or a regular grid module can connect to various structures in relation to the catalyst support grid. The structures here are referred to as external structures as they are not part of the grid module itself may e.g. be other grid modules or support structures such as beams, frames etc. arranged to support grid modules.

Each grid module may comprise one or more sides with one or more module connecting part. The module connection parts may be on different sides and may be the same or different types arranged to create a tongue/groove connection with a receiving connecting part.

A grid module may be rectangular, triangular or of other shape depending on the space which it is arranged to cover. This also means that some grid modules may have one or more curved sides for example where the grid module is arranged to abut an inner reactor wall.

For example a grid module may comprise a first, second and/or third type of module connecting part. The different types of connecting parts may e.g. be arranged to allow easy removal which may be beneficial in manway grid modules. It is also possible that some types of connecting parts are arranged to allow simple installation of the grid module in a larger structure of interconnected grid modules/external structures which e.g. may be relevant for the regular grid modules.

The first, second and/or third type of module connecting part has a U shape or is a protruding structure, such as a l or L type shape. U shapes may be arranged to connect with a receiving part having a U or l, or L shape or other shape which can interlock in a tight connection with the module connecting part. Similarly 1 or L type shapes may be arranged to interlock in a tight connection with the module connecting part such as various U shapes.

Where two or more grid modules are to connect at least one grid module may comprise a module receiving part i.e. a part on the grid module arranged to receive the module connecting part from another grid module.

Module connecting parts and receiving parts may be of the same types depending on setup and specific use of each part. The key issue is that the receiving part and connecting part form a tongue/groove connection.

However if a specific definition is needed it can for example be defined that module connecting parts are inverted U or L shapes and module receiving parts are U or L shapes i.e. for example they may be named by their orientation in use. This notation can be extended to connecting parts on external structures in which case externals e.g. may have a connecting part for connecting to a module receiving part.

In many advantageous embodiments the connection cross-section has a S-shape as this shape provides a relatively long path for any debris, dust etc. which may enter the path which means that the debris, dust etc. will get stuck or otherwise settle in the path. I.e. the S-shape cross section provides a highly effective gasket-less seal.

In other embodiments the connection cross section may be a half S shape, Z or L like.

In order to ensure that the tongue/groove connection may function optimally in a gasket-less setup the free space/play in the connection cross section at least in some areas are small. If the free space/play in the connection cross section at least in some areas are less than 4 mm, such as 1-3 mm particulates which with an air stream enters the path in the connection will be stopped somewhere in the path (such as the S shaped path of a S shaped connection cross section).

Connection cross sections with bends/kinks may further assist the collection of debris in the connection cross section path.

The fact that the present invention allows grid modules to be arranged with free space/play in relation to other grid modules and/or external structures greatly improve the requirements to the tolerance in dimensions during production as dimensions can be allowed to vary within a range such as from less than one mm to several mm. This free space/play in the connection cross section also renders it easier to install the grid modules/system as less precision in alignment of modules etc may be required.

The connecting and/or receiving parts may be formed by welded and/or bend metal sections. The metal sections are preferably dimensioned to ensure stability while still being reasonably easily handled in the workshop. E.g. the metal sections are of metals plates with a thickness from 2-10 mm, such as 5 mm.

Especially the manway grid modules may comprise a free side arranged to abut a second manway grid module as this may provide a solution for a manway comprising at least two manway grid modules which thus can be easily (re)assembled. If the two manway grid modules are placed with each their free side abutting the free side of the other manway grid module the free side can be a smooth or at least partly smooth side as this may create a sufficiently tight connection between the two manway grid modules. If e.g. the two manway grid modules are held together for example by fastening means so that the two free sides are pressed together in a tight fitting connection no debris etc can enter between the two free sides of the manway grid modules.

The free sides may also comprise patterns such as grooves or lines to improve seal between the two manway grid modules and/or to assist in aligning two manway grid modules during installation etc.

The grid modules may comprise means for fastening the grid module to one or more external structures. The fastening means are preferably easy to handle and operate, a feature which is especially relevant in the manway grid modules which are to be temporarily removed e.g. during reactor maintenance.

The fastening means may be various means for clamping, bolting, pulling or otherwise fixate one or more grid modules to each other and/or to external structures.

In several advantageous embodiments the grid modules are fixated and/or fastened to each other and/or to external structures by means which requires a minimum or no tools.

The present application also relates to a modular catalyst support grid system comprising—at least one manway grid module having one or more sides arranged with module connecting parts, and at least one external structure. Due to the simple but highly effective connections achieved by the tongue/groove connections the grid modules advantageously form part of a larger modular catalyst support grid system as the different parts in the modular system can be assembled by simply fixing the different modules/external structures together.

The external structure may be one or more of manway frame, beam wall, regular grid module and/or (another) manway grid module.

Typically the system is arranged so that one, two or three manway grid modules are used and can be temporarily removed during maintenance. Preferably more than one manway grid module is used as this allows each manway module to be smaller and thus less heavy and hard to handle.

Preferably the one or more external structures include at least one manway frame having one or more receiving connecting parts. A manway frame may form a circumferential frame around the manway or along at least one side of the manway. E.g. a manway frame comprises two frame sections suspended between two support beams, this way the manway may be surrounded by two frame sections and two support beams which together form a circumferential frame around the manway opening when the one or more manway grid modules are removed.

Each manway frame section comprises at least one and preferably two receiving connecting parts one on each side of the frame section so that the frame section may receive a manway grid module and on the other side may receive another grid module such as a regular grid module.

The modular catalyst support system may also comprise one or more receiving connecting parts on one or more support beams as this allows the grid modules to form tongue/groove connections fixing and/or sealing the grid modules to the support structure incl. the support beams.

Thus, in several embodiments is provided a modular catalyst support grid wherein
  each manway grid module and regular grid module comprises a number of module connecting parts
  the external structures comprises a number of receiving connecting part
  the module connecting part has a U shape or is a protruding structure, such as a 1 or L shape and/or
  the receiving connecting part has a U shape or is a protruding structure, such as a 1 or L shape.

Preferably the modular catalyst support system comprises e one or more manway grid modules and/or regular grid modules as described herein.

The system can be arranged to be installed in various ways. In some embodiments the one or more of the regular modules to engage with/connect to the reactor wall are installed first. These regular modules installed by the reactor wall may be fixed by tongue groove connection but may also be arranged with alternative seals such as regular known seals such as robe seals. For example traditional seals may be used where a receiving part cannot be arranged on the reactor wall.

After this one or more first regular modules are installed further regular modules may be installed by fixating them by at least one tongue/groove to the first installed regular modules and/or external parts.

Preferably the frame sections are installed during this initial installation of the grid system. Where a manway is to be installed a frame section is put into place in relation to beams and the already installed regular grid modules, thereby forming a first part of the frame onto which a manway grid module can be connected. Here after the manway grid modules e.g. one, two or three manway grid modules are put into place in relation to the frame section, beam walls and each other whereafter a second frame section is put into place and fixed whereby the two frame sections and beam walls forms a manway frame. Further regular modules can be installed in relation to existing regular modules and/or in relation to the second frame section if desired. When the manway grid modules are removed for example during maintenance the manway frame outlines the manway opening and keeps the remaining grid modules in place.

When the manway grid modules are to be reinstalled they are simply put into place and fixed to the manway frame (comprising the beam walls and two frame sections) by means and tongue/groove connection. The manway modules are preferably pulled together to ensure a tight connection between manway grid modules by their free side.

Where three manway grid modules are used preferably a first manway grid module connect to a first frame section by a module connecting part, and to an adjacent manway module by a free side. The second manway module connects to the first manway grid module by a first free side and to adjacent third manway grid module by a second free side. The third manway grid module connects to the second manway grid module by a free side and to the second frame section by a module connecting part. I.e. in this setup the three manway grid modules preferably all connects to receiving parts on the beam walls whereby a sealing tongue/groove connection is formed along the inner perimeter of the manway opening as the manway grid modules forms sealing and fixating tongue/groove connections with receiving means on frame sections and beam walls forming the manway frame.

If the grid modules rest on a support shelf arranged in the longitudinal direction along the lower part of the beam walls these support shelves carry at least part of the weight of the grid modules. When one or more support shelves at least partly support/carry a grid module the stress on e.g. the tongue/groove connecting parts on grid module and/or external structures are lessened or even removed.

Also the frame sections may at least partly rest on one or more support shelves.

The grid modules may be made by wielding two L-shaped metal rods to the two catalyst supports whereby module connecting parts are provided.

The frame sections may be bolted to the beams and the fastening technique may include a mechanism that allows partial installation to delimitate the space, and the possibility of axial translation, perpendicular to the beams and parallel to the axis of the reactor, to allow the tongue of the frame to receive the preceding groove during installation. The frames sections may finally by bolted to the beams.

The dimensions of the frame are such to allocate an integer number of modular grids. Whereas the dimensions have to be at least such to allow the passage of an operator, the performance of the method does not depend upon the number of modular grids in the manway and this may be chosen based on project-specific requirements.

The connection between the manway grids does not require a tongue-groove system. Sufficient tightness to avoid the passage of catalyst debris is achieved by positioning the grids tight to each other and fastening the system for example with a quick release, meaning a fastening system that may be locked and unlocked in a very short time and without the use of tools.

The catalyst support of this invention is for example assembled by installing first the grid at the reactor wall. This grid has a groove at the side opposite to the side touching the wall. A second grid, having a tongue (or groove depending on what to connect to) in one of the side, and a grid at the other is then fixed to the first. Alternatively, a frame section, is pushed down in its location and tightened to the first grid. The installation continues by positioning all the grids in their location.

The mechanical design of the modules and system preferably follows various criteria of stability, ease of manufacture and performances, both with regards to the avoidance of risk of passage of solid debris, and to ease of assembly and disassembly.

The thickness of the material of construction of both tongue and groove is defined by criteria of stability, and ease of manufacture in workshop and possibly also in addition, weight constraints.

Generally catalyst supports grids are used in various setups including multi-catalyst-bed hydroprocessing reactors in which a catalyst support for each catalyst bed is arranged. In several setups, the catalyst support is for use in radial flow and down-flow catalytic reactors which include vertically superimposed packed beds of particulate catalytic material wherein a liquid, liquid and gas mixture or vapour is processed as it flows down through the packed beds. This type of catalyst supports and reactors are used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC) and synthesis reactions.

The one or more catalyst beds in the reactor may need to be supported to retain the catalyst but the support must enable process fluid to flow through the support to be processed in the reactor bed(s). Catalyst support grids in the reactor are usually built by a number of cassettes, each with a weight of 100-500 kg making handling cumbersome as well as time and resource demanding. As crane time often determines the time for assembly and disassembly of the catalyst support grid, the disassembly time is often in the range of 2 days, roughly the same as the assembly time.

Thus, according to the present application is provided manway grid modules, regular grid modules, frame sections as well as a modular system comprising these elements.

Both regular grid modules and manway grid modules are arranged in order for them to be assembled into a modular catalyst support wherein the grid modules are arranged in relation to each other and external structures at least partly by means of gasket free tongue and groove connections.

In order to ensure a structure preventing particulates to flow across the modular catalyst support (e.g. through leaking connections), connections between adjacent grid modules and connections between grid modules and external structures are arranged with tongue/groove connections or free sides which are held tightly together (as described for the manway modules).

Thus, a grid module (regular or manway) may be arranged with module connecting parts on two opposing sides for engaging with receiving connecting parts on the beam walls thereby both fixing the grid module to the beam wall as well as creating a connection cross section which prevents particulates from leaking through the connection.

Furthermore, a grid module (regular or manway) may be arranged with parts on two opposing sides for engaging with parts on other grid modules and/or frame sections thereby both fixing the grid module to the other grid modules and/or frame sections as well as creating a connection cross section which prevents particulates from leaking through the connection.

I.e. according to the present it is possible to ensure gasket free connections on some or preferably all sides of each grid module (regular or manway) while ensuring that particulates are at least substantially prevented from passing through the connection (tongue/groove or free side to free side).

In the following the invention is further described with reference to the drawings. The drawings and related text are exemplary and are not to be construed as limiting to the invention.

FIG. 8 shows three exemplary connection cross sections.

FIG. 9 illustrates more details of a connection cross section.

Figure 1:
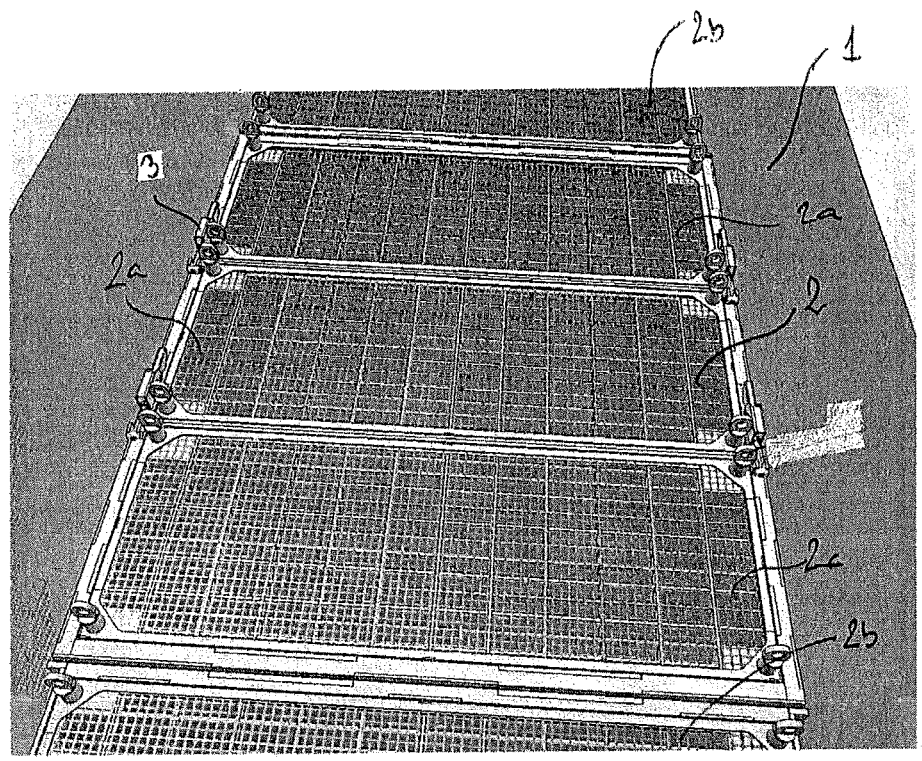
FIG. 1 shows a modular catalyst support system according to the invention

FIG. 1 shows a modular catalyst support system 1 comprising a number of grid modules 2 fastened to each other and external structures by tongue/groove connection (not shown) and further locked by fastening means 3. Modules 2a are manway grid modules and modules 2b are regular grid modules.

Figure 2:
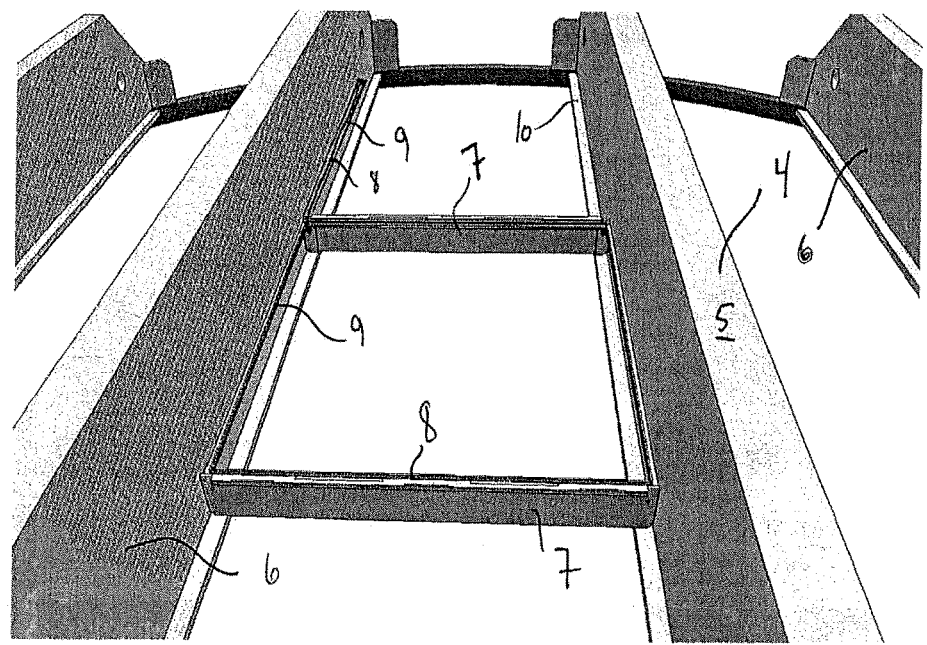
FIG. 2 shows a view of support beams and a frame

FIG. 2 shows support beams 4 arranged across the interior of a reactor (not shown). Each support beam has a beam top 5 and a two opposing beam walls 6. Here the support beams are arranged with regular intervals but the distance between the support beams may vary depending on the specific reactor setup.

Between two support beams are suspended two frame segments 7 which each has receiving parts 8 for receiving grid module connecting parts from one or more grid modules (not seen). Along the beam wall section defined by the two frame sections receiving parts 8 are arranged, here as a rail 9 arranged in the longitudinal direction of the beams in a high which flush with the receiving parts 8 of the frame segments 7. In this example a part of the beam wall outside the area defined by the frame segments also is arranged with a rail 9 arranged as a receiving part 8 to connect to one or more grid modules (not shown).

At the lower part of each beam wall a support shelf 10 is arranged in the longitudinal direction. In the present setup the support shelf runs in the full length of the beams but it is possible that the support shelf can run along sections of the beams and/or be formed by shorter support shelf sections.

Figure 3:
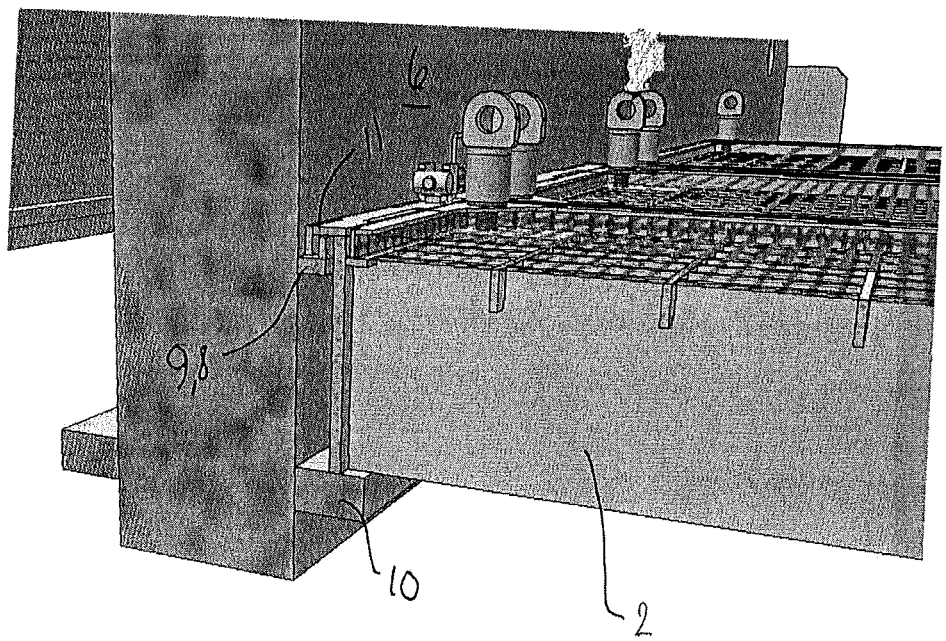
FIG. 3 shows a view of a connection between a grid module and a receiving part on a beam wall

FIG. 3 shows how a grid module 2 connected to a beam wall 6 in a gasket less sealing tongue/groove connection formed by a module connecting part 11 and a receiving part 8 arranged as a rail 9 on the beam wall 6. In this setup the receiving part is a basically L shaped structure and the grid module connecting part 11 an inverted U profile. The grid module rests on the support shelf 10.

Figure 4:
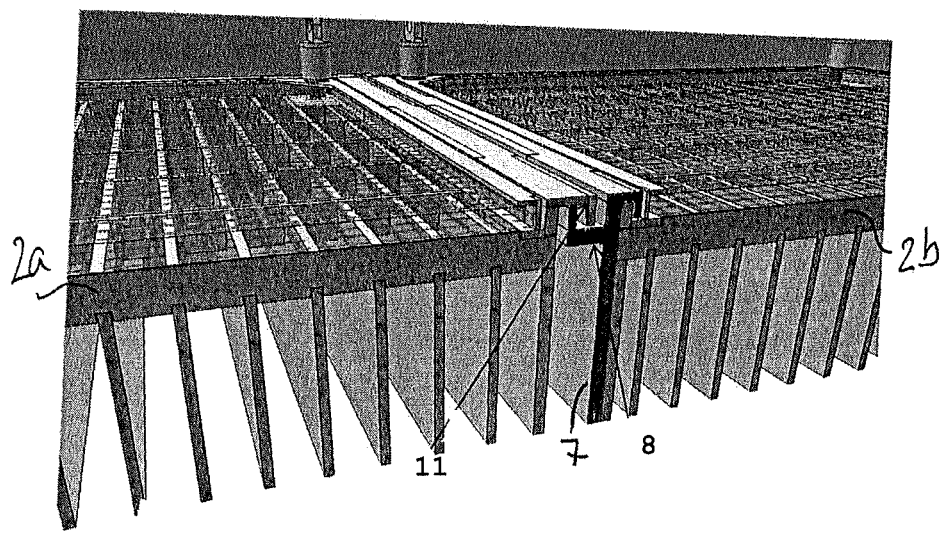
FIG. 4 shows a cross section of the catalyst support system taken along the line IV-IV

FIG. 4 shows how a manway grid module 2a by a module connecting part 11 connects to one receiving part 8 of a frame section 7 while a regular grid module by a module connecting part 11 connects to another receiving part of the frame section.

The receiving part of the frame section, receiving the connecting part from the manway grid module is a U shape allowing the protruding part of the manway connecting part to be inserted into the receiving part when the manway module is put into place when the system is originally installed or after a manway module has been removed e.g. during maintenance.

When the other receiving part of the frame section is an inverted U as here the frame section may easily be placed on the regular grid module 2b when the system is installed.

Figure 5:
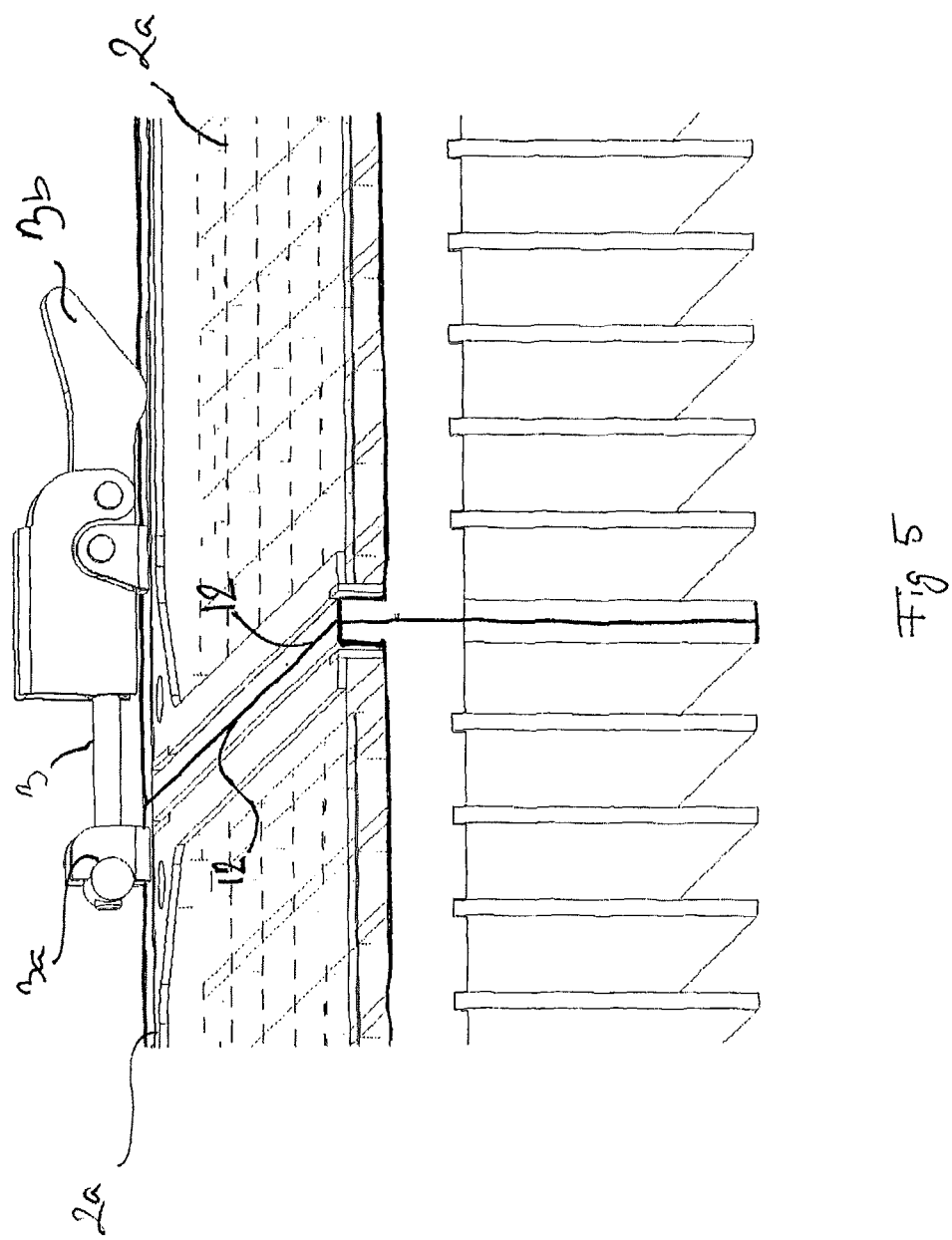
FIG. 5 shows two manway grids connected by their free side

FIG. 5 shows how two manway grid modules 2a are connected free side 12 to free side 12. Fastening means 3 are used to pull the manway modules together helping to ensure a tight fit between the two manway grid modules.

Figure 6:
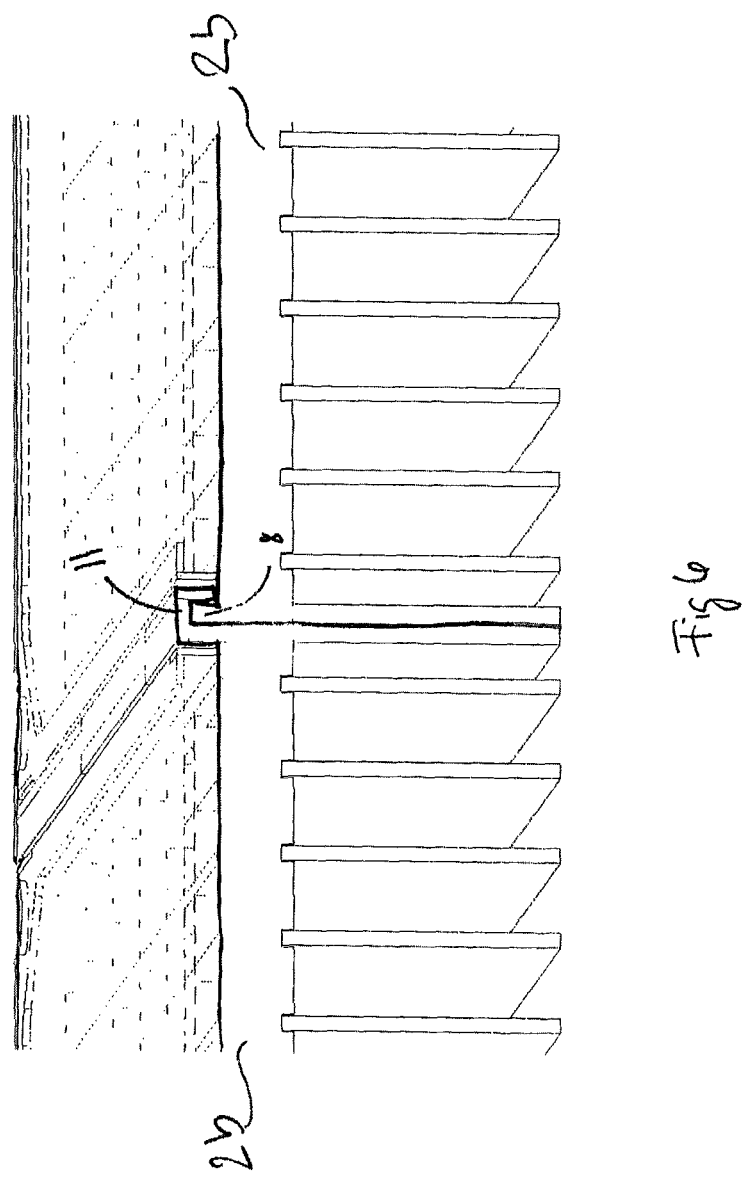
FIG. 6 shows two regular grids connected via tongue/groove connection.

FIG. 6 shows how two regular grids are connected by a tongue/groove connection. During installation the right module (shown having receiving part 8) will typically be installed first where after the left module (shown with grid module connecting part 11) can simply be slid into place with the connecting part 11 fitting over the receiving part 8 of the right module.

Figure 7:
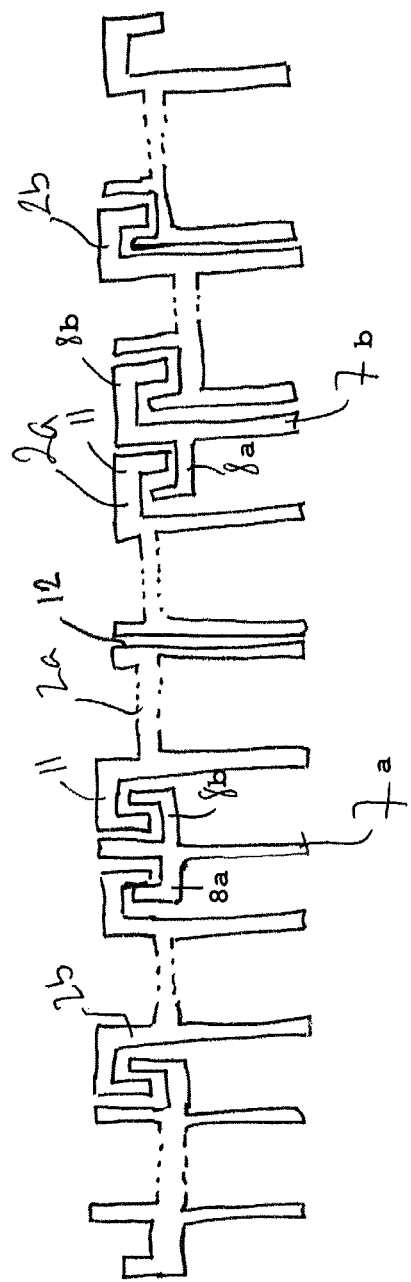
FIG. 7 shows various connections between module connecting parts and receiving parts

FIG. 7 shows a schematic setup of two of frame sections 7a and 7b, two grid module sections 2a and four regular grid modules 2b. It is seen how the arrangement of the connection may differ while still all being based on the basic tongue/groove connection.

Where two grid modules connect the connection is made by a module connecting part (e.g. inverted U or downwards pointing L shape) on one grid module which interlocks with a module receiving connecting part (e.g. U or upwards pointing L shape) on the other grid module.

Two different types of frame sections are shown. A first frame section 7a with a symmetric design having a first receiving connecting part 8a in form of an upwards pointing L shape receiving an inverted U shape from a grid module on one side and a similar L shaped second receiving connecting part 8b receiving an inverted U shape 11 from a manway grid module 2a on the other side.

A second frame section 7b with a non-symmetric design having a first receiving connecting part 8a in form of an upwards pointing L shape receiving an inverted U shape from a manway grid module 2a on one side and a second receiving connecting part 8b in form of an inverted U receiving an U or L shape from a regular grid module 2b on the other side.

FIG. 8 shows three different connection cross sections shown by broken lines C. The cross sections can be described as a) a Z shape, b) a S shape, c) half S shape.

FIG. 9 shows a connection cross section where different free space/play ranges are seen. g, j, k, l, m marks different cross section widths or free space/play of different sections of the connection cross section. h, i, n, o, p indicate sections of the connection cross section path.

For example an air stream entering along the direction indicated by arrow A will flow along the path with length indicated by p and with k. p and k along with c, j etc are here adjusted to ensure that any debris will be caught along the path of the connection cross section. Bends and kinks may further ensure that debris will be caught in the path. I.e. a connection cross section with narrow sections such as section with width j and length c, longer sections such as the section with length p and/or one or more bends or kinks Q may provide a connection cross section which effectively may function as a gasket-less connection.

The thicknesses of the plates indicated by (a), (b), (c), (d), and (e) may or may not be the same. For common hydroprocessing applications, the plates have a thickness from 3 to 8 mm, preferably of 5 mm.

The tongue may be realized by several methods of production. The preferred method of production is bending. The groove may be realized by several methods of production, the preferred method is bending of the external side and welding of the internal side (belonging to the grid module).

The length of the tongue (f) may be constrained by criteria of stability and ruggedness to avoid deformation in case of bumping of the equipment. For common hydroprocessing applications the length (f) is typically between 15 and 20 mm. This length is typically 19 mm with bended 5 mm plates, while it is 16.5 if it is welded, to avoid internal filet.

The distances from the tip of the tongue, to the base of the groove (g) and from the tip of the groove to the roof of the tongue (i) may be constrained to ensure that even the smallest debris of catalyst or other solid will not pass through. For hydroprocessing reactors, such distance may often be limited to a maximum of 3 mm, and it is preferably 1.5 mm (possibly with ±0.5 mm for tongue and groove combined).

The depth of the groove (h) is mainly limited by criteria of stability. It varies from 5 to 20 mm, and a typical length would be 11.5 mm and it is preferably of 10 mm.

The width of the groove (i) may be less critical and may have a lower limit defined by ease of manoeuvrability, so that the modular grid can be fit within its enclosing even though the operation is conducted in confined space and with protective equipment, and a higher limit, due to stability. The distance (i) may be between d+4.5 and d+105 mm, and it is preferably d+3 mm.

The invention claimed is:

1. A grid module for a catalyst support comprising one or more sides arranged with a module connecting part to engage in a tongue/groove connection with a matching receiving connecting part on an external structure, wherein the tongue/groove connection has a cross-section having an S-shape, a Z-shape or a half S-shape.

2. A grid module according to claim 1, wherein the formed tongue/groove connection provides a gasket free connection.

3. A grid module according to claim 1, wherein the grid module is a manway grid module or a regular grid module.

4. A grid module according to claim 3, wherein the external structure is a manway frame, beam wall and/or second manway grid module thereby providing at least one gasket free seal between the module connecting part and the receiving connecting part on one or more external structures.

5. A grid module according to claim 3, comprising a free side arranged to abut a second manway grid module.

6. A grid module according to claim 3, comprising
one or two free sides arranged to abut a second and/or third manway grid module
three or two sides each arranged with a module connecting part to engage in a tongue/groove with a matching receiving connecting part on an external structure.

7. A grid module according to claim 3, wherein the module connecting part has a U shape or is a protruding structure, such as a l shape or an L shape.

8. A grid module according to claim 3, comprising means for fastening the manway grid module.

9. A grid module according to claim 3, wherein the external structure is a manway frame, beam wall and/or second regular grid module thereby providing at least one gasket free seal between the module connecting part and the receiving connecting part on the external structure.

10. A grid module according to claim 3, comprising four sides each arranged with module connecting part to engage in a tongue/groove connection with a matching receiving connecting part on an external structure.

11. A grid module according to claim 3, wherein the module connecting part has a U shape or is a protruding structure, such as a l or L shape.

12. A grid module according to claim 3, comprising means for fastening the regular grid module.

13. A modular catalyst support grid system comprising:
at least one manway grid module having one or more sides arranged with module connecting parts, and
at least one manway frame having one or more receiving connecting parts,
wherein the module connecting parts engage the receiving connecting parts in a tongue/groove connection, wherein the tongue/groove connection has a cross-section having an S-shape, a Z-shape or a half S-shape.

14. A modular catalyst support system as recited in claim 13, wherein the manway frame comprises two frame sections suspended between two support beams.

15. A modular catalyst support system as recited in claim 13, wherein each manway frame section comprises two receiving connecting parts, one on each side of the frame section.

16. A modular catalyst support system as recited in claim 13, further comprising a receiving connecting part on one or more support beams.

17. A modular catalyst support system as recited in claim 13, further comprising a second manway grid module.

18. A modular catalyst support system as recited in claim 13, further comprising at least one regular grid module.

19. A modular catalyst support system as recited in claim 18, wherein:
each manway grid module and regular grid module comprises a number of module connecting parts;
the external structures comprises a number of receiving connecting part;
the module connecting part has a U shape or is a protruding structure, such as a l or L shape; and/or
the receiving connecting part has a U shape or is a protruding structure, such as a l or L shape.

20. A modular catalyst support system comprising one or more grid modules as recited in claim 1.

21. A reactor comprising one or more grid modules according to claim 1.

* * * * *